US012775446B2

(12) United States Patent
Dibrino

(10) Patent No.: US 12,775,446 B2
(45) Date of Patent: Oct. 27, 2026

(54) SINGLE-CYCLE KULISCH ACCUMULATOR

(71) Applicant: HUAWEI TECHNOLOGIES CO., LTD., Shenzhen (CN)

(72) Inventor: Michael Dibrino, Austin, TX (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1003 days.

(21) Appl. No.: 18/071,426

(22) Filed: Nov. 29, 2022

(65) Prior Publication Data

US 2023/0092574 A1 Mar. 23, 2023

Related U.S. Application Data

(63) Continuation of application No. PCT/US2020/044664, filed on Jul. 31, 2020.

(60) Provisional application No. 63/032,572, filed on May 30, 2020.

(51) Int. Cl.
*G06F 7/544* (2006.01)
*G06F 7/509* (2006.01)

(52) U.S. Cl.
CPC .......... *G06F 7/5443* (2013.01); *G06F 7/5095* (2013.01)

(58) Field of Classification Search
CPC ..................... G06F 7/509–5095; G06F 7/5443
See application file for complete search history.

(56) References Cited

U.S. PATENT DOCUMENTS

| | | | | |
|---|---|---|---|---|
| 2009/0182795 | A1 | 7/2009 | Dobbek et al. | |
| 2010/0121898 | A1 * | 5/2010 | Swartzlander, Jr. .... | G06F 17/16 708/501 |
| 2019/0294415 | A1 * | 9/2019 | Kaul ...................... | G06N 20/00 |
| 2020/0409661 | A1 * | 12/2020 | Brunie .................. | G06F 7/4876 |

OTHER PUBLICATIONS

Kulisch, Ulrich, and Gerd Bohlender. "High speed associative accumulation of floating-point numbers and floating-point intervals." Reliab. Comput 23 (2016): 141-153. (Year: 2016).*
International Search Report and Written Opinion dated Feb. 18, 2021, International Application No. PCT/US2020/044664.
Uguen, Yohann et al., "Design-Space Exploration for the Kulisch Accumulator", Mar. 20, 2017, 7 pages.
Kulisch, Ulrich et al., "The Exact DOT Product as Basic Tool for Long Interval Arithmetic; DotProd-11", IEEE Draft, vol. 1788, 2009, pp. 1-7.
International Preliminary Report on Patentability dated Dec. 15, 2022, International Application No. PCT/US2020/044664.

* cited by examiner

*Primary Examiner* — Matthew D Sandifer

(57) ABSTRACT

A processor to calculate a floating-point dot-product that receives a sequence of first and second floating-point numbers in which the sequence of the first and second floating-point numbers having a sign, a mantissa value and an exponent value. A floating-point unit determines the floating-point dot-product of the sequences by adding the exponent values to determine an exponent product, calculating a shift amount as a one's complement of a low exponent, multiplying the mantissas of the sequences to determine a product value of the mantissas, right shifting the product value of the mantissa by the shift amount to generate a shifted product, selecting segments of an accumulator based on a high exponent, and adding the selected segments to the shifted product to generate a sum. The sum is then written into the selected segments of the accumulator.

18 Claims, 10 Drawing Sheets

| 1002 | 1004 | | | | 1006 | | | | 1008 | 1008A | 1008B | 1010 | | | 1012 | 1014 | |
|---|---|---|---|---|---|---|---|---|---|---|---|---|---|---|---|---|---|
| | Src0 (Hexadecimal) | | | | Src1 (Hexadecimal) | | | | Mantissa Product | Product Exponent- 10 Bits 2's Complement (Biased) | Product Exponent (Unbiased) | Calculations for ExpHi/ExpLo | | | Shift Amount | Segment Start | Segment Value - 79 Bits |
| Operand | Value | Sign | Exponent | Mantissa | Value | Sign | Exponent | Mantissa | (Hexadecimal) | (Hexadecimal) (Exp0 + Exp1 - 0x7F) | (Decimal) (Exp0 + Exp1 - 0x7F - 0x7F) | (Hexadecimal) Exp0 + Exp1 + 1 | (Decimal) Exp Hi | (Decimal) Exp Lo | (Decimal) (31-ExpLo) | (Decimal) (ExpHi) | (Hexadecimal) n n+1 n+2 |
| 1 | 3F801234 | 0 | 7F | 801234 | 3F7EDCBA | 0 | 7E | FEDCBA | 7F80_7C49_E9C8 | 0x7E | -1 | 0x0FE | 7 | 30 | 1 | 7 | 3FC0_3E24 F4E4_0000 0000 |
| 2 | 00000001 | 0 | 0 | 000001 | 00000001 | 0 | 0 | 000001 | 0000_0000_0001 | 0x383 (-0x7D) | -252 | 0x003 | 0 | 3 | 28 | 0 | 0000_0000 0000_0000 0010 |
| 3 | 40000001 | 1 | 80 | 800001 | 40000001 | 0 | 80 | 800001 | 4000_0100_0001 | 0x81 | 3 | 0x101 | 8 | 1 | 30 | 8 | FFFF_FFFE FFFF_FCFF FFFC |
| 4 | 5CC47ADD | 0 | B8 | C47ADD | 7EABCD44 | 0 | FD | ABCD44 | 83DB_9C32_9BB4 | 0x136 | 183 | 0x1B6 | 13 | 22 | 9 | 13 | 0000_020F 6E70_CA6E D000 |
| 5 | 527FFFFF | 0 | A4 | FFFFFF | 467FFFFF | 0 | 8C | FFFFFF | FFFF_FE00_0001 | 0x0B1 | 98 | 0x131 | 9 | 17 | 14 | 9 | 0003_FFFF F800_0000 0000 |
| 6 | 5F000000 | 0 | BE | 800000 | C0000000 | 1 | 80 | 800000 | 4000_0000_0000 | 0x0BF | 64 | 0x13F | 9 | 31 | 0 | 9 | C000_0000 0000_0000 0000 |

FIG. 10A

SINGLE-CYCLE KULISCH ACCUMULATOR

CLAIM OF PRIORITY

This application is a continuation of, and claims priority to, PCT Patent Application No. PCT/US2020/044664, entitled "SINGLE-CYCLE KULISCH ACCUMULATOR", filed Jul. 31, 2020, which claims priority to U.S. Provisional Application No. 63/032,572, entitled "SINGLE-CYCLE KULISCH ACCUMULATOR", filed May 30, 2020, which applications are incorporated by reference herein in their entirety.

FIELD

The following is related generally to the field of microprocessors and, more specifically, to microprocessor-based devices for performing floating-point arithmetic.

BACKGROUND

Computer systems frequently include a floating-point unit, or FPU, often referred to as a math coprocessor. In general-purpose computer architectures, one or more FPUs may be integrated as execution units within the central processing unit. A important category of floating point calculations is for the calculation of dot-products (or inner-products) of vectors, in which a pair of vectors are multiplied component by component and the results then added up to provide a scalar output result. An important application of dot-products is in artificial neural networks. Artificial neural networks are finding increasing usage in artificial intelligence applications and fields such as image and video recognition, recommender systems, image classification, medical image analysis, natural language processing, expert systems, autonomous (self-driving) vehicles, data mining, and many other applications. An artificial neural network is formed of a large number of layers through which an initial input is propagated. At each layer, the input will be a vector of values that is multiplied with a vector of weights as a dot-product to provide an output for the layer. Such artificial neural networks can have very large numbers of layers (network depth) and involve large numbers of dot-products within each of layer (network width), so that propagating an initial input through a network is extremely computationally intensive. When training an artificial neural network (i.e., the process of determining a network's weight values), a number of iterations are typically required to be repeatedly run through the network to determine accurate weight values. Given the increasing importance of artificial networks, the ability to efficiently compute large numbers of dot-products is of great importance.

When computing a dot-product of floating-point vectors, the components of the vectors are individually multiplied and summed. To properly align the accumulated sum of the dot product, the maximum exponent of the individual products needs to be determined, as each mantissa dot-product must be right-shifted by the difference between the maximum exponent and each dot-product's exponent. This process can quite time consuming, requiring several processing cycles and slowing down the dot-product computation. Given the extremely large numbers of dot-product computations involved in both the training and inferencing phases for artificial neural networks, the ability to more rapidly compute dot-products is of increasing importance.

SUMMARY

According to one aspect of the present disclosure, there is a method of calculating a floating-point dot-product performed by a processor, comprising receiving a sequence of first floating-point numbers of a first operand at a floating-point unit (FPU) processor, the sequence of the first floating-point numbers having a sign, a mantissa value and an exponent value; receiving a sequence of second floating-point numbers of a first operand at a floating-point unit (FPU) processor, the sequence of the second floating-point numbers having a sign, a mantissa value and an exponent value; storing the of the sequence of the first and the second floating-point numbers in one of a memory or a register; determining, by the FPU, the floating-point dot-product of the sequence of the first floating-point numbers and the sequence of the second floating-point numbers, by: adding the exponent values of the sequence of the first and the second floating-point numbers to determine an exponent product, the exponent product having a high exponent and a low exponent; calculate a shift amount as a one's complement of the low exponent; multiplying the mantissas of the sequence of the first and second floating-point numbers to determine a product value of the mantissas; right shifting the product value of the mantissa by the shift amount to generate a shifted product; selecting one or more first segments of an accumulator based on the high exponent, and adding the one or more first selected segments to the shifted product to generate a sum; and writing the generated sum into the selected one or more first segments of the accumulator.

Optionally, in the any of the two preceding aspects, wherein the accumulator includes one or more second segments consisting of the leftmost bits to a left of the one or more first segments; the accumulator includes one or more third segments consisting of the rightmost bits to a right of the one or more first segments; a second accumulator register divided into segments, in which each segment's value is one more than the value present in the corresponding segment of the accumulator; and a third accumulator register, divided into segments, in which each segment's value is one less than the value present in the corresponding segment of the accumulator.

Optionally, in the any of the two preceding aspects, wherein each segment in the accumulator include first and second flag register bits, the first and second flag register bits identify a state of each segment in the accumulator, and each of the first and second flag register bits are updated when bits in a corresponding.

Optionally, in the any of the two preceding aspects, wherein the first flag register includes all one bits and the second flag register includes all zero bits.

Optionally, in the any of the two preceding aspects, the method further comprising: updating the one or more second segments when the sum written into the one or more first segments of the accumulator is positive with a carry-out, wherein j+1 of the one or more second segments are loaded from a corresponding j+1 of the one or more of the corresponding second accumulator segments, j+1 of the one or more corresponding third accumulator-segments are loaded from a corresponding j+1 one or more second segments of the accumulator, j+1 of the one or more corresponding second accumulator register segments are incremented, and j represents a number of consecutive segments set with the first flag bits immediately to the left of the first segments.

Optionally, in the any of the two preceding aspects, the method further comprising updating the one or more second segments when the sum written into the one or more first segments of the accumulator is negative, wherein j+1 of the one or more second segments are loaded from a corresponding j+1 of the one or more of the corresponding third accumulator segments, j+1 of the one or more corresponding second accumulator segments are loaded from a corresponding j+1 one or more second segments of the accumulator, j+1 of the one or more corresponding third accumulator register segments are decremented, and j represents a number of consecutive segments set with the second flag bits immediately to the left of the first segments.

Optionally, in the any of the two preceding aspects, wherein the one or more third segments consisting of the rightmost bits to the right of the one or more first segments remain unchanged by selecting the one or more third segments output as the next input to the corresponding one or more third segments or by clock-gating the segments off.

Optionally, in the any of the two preceding aspects, wherein the floating-point dot product is a 2's complement format of the values of the registers of the accumulator for all segments.

Optionally, in the any of the two preceding aspects, wherein when the floating-point dot product is positive, the floating-point dot product is a sign-magnitude format of the values of the registers of the accumulator for all segments, excluding the most significant bit of the registers; when the floating-point dot product is negative, the floating-point dot product is a sign-magnitude format of a 1's complement of the values of the registers of the third accumulator for all segments, excluding the most significant bit of the registers, and the sign-bit of the floating-point dot product is the most significant bit of the registers of the accumulator regardless of whether the most-significant bit of the registers of the accumulator was positive or negative.

According to one further aspect of the present disclosure, a microprocessor includes microprocessor, comprising a first input register configured to hold a sequence of first floating-point numbers of a first operand, the sequence of the first floating-point numbers having a sign, a mantissa value and an exponent value; a second input register configured to hold a sequence of second floating-point numbers of a first operand, the sequence of the second floating-point numbers having a sign, a mantissa value and an exponent value; and a floating-point unit connected to the first and second input registers and configured to compute the floating-point dot-product of the sequence of the first floating-point numbers and the sequence of the second floating-point numbers, the floating-point unit comprising an adder adding the exponent values of the sequence of the first and the second floating-point numbers to determine an exponent product, the exponent product having a high exponent and a low exponent; a set of inverters, one for each bit of the low exponent, which calculate a shift amount as a one's complement of the low exponent; a multiplier multiplying the mantissas of the sequence of the first and second floating-point numbers to determine a product value of the mantissas; a shifter, right shifting the product value of the mantissa by the shift amount to generate a shifted product; a multiplexor selecting one or more first segments of an accumulator based on the high exponent, and adding the one or more first selected segments to the shifted product to generate a sum; and a set of multiplexors, one for each segment of the accumulator, which write the generated sum into the selected one or more first segments of the accumulator.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

FIGS. 10A and 10B illustrates an example

DETAILED DESCRIPTION

The disclosed technology generally relates to microprocessor-based devices for performing floating-point arithmetic. More specifically, the disclosure relates to an accumulator, such as a Kulisch Accumulator, which allows for removal of sources of rounding errors in a sum of products. In one embodiment, this is achieved using an accumulator which contains an entire floating-point range, in which a single product is added to the accumulator every cycle. In particular, a very wide fixed-point accumulator is used whose bits cover the full exponent range of a product. For single precision, the weights of the bits can range from $2^{-126-23}=2^{-149}$ to $2^{127}$. Multiplying two such single-precision numbers produces a result with a range from $2^{-298}$ to $2^{254}$, which is a range of 552 bits. In one embodiment, the fixed-point result is in sign-magnitude format.

It is understood that the present embodiments of the disclosure may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

Figure 1A:
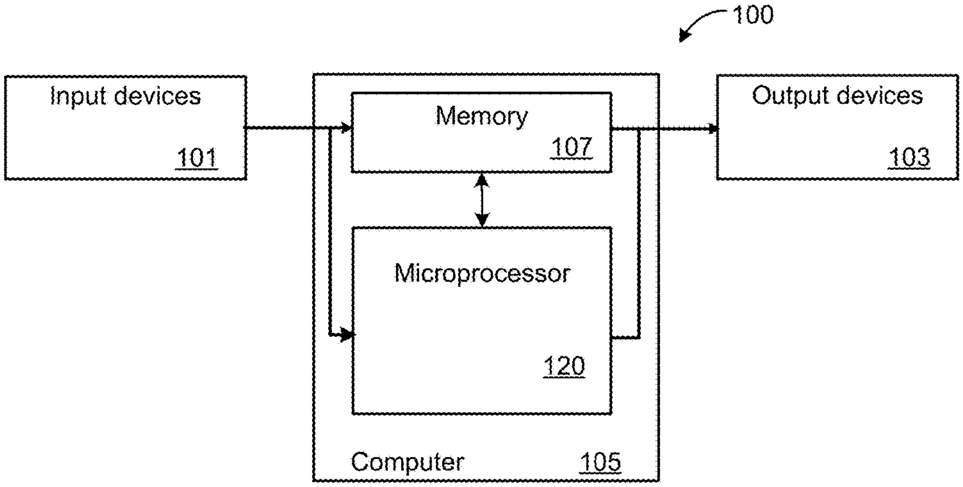
FIGS. 1A and 1B are respectively block diagrams of a computer system and a microprocessor that can be incorporated into such a computer system.
Figure 1B:
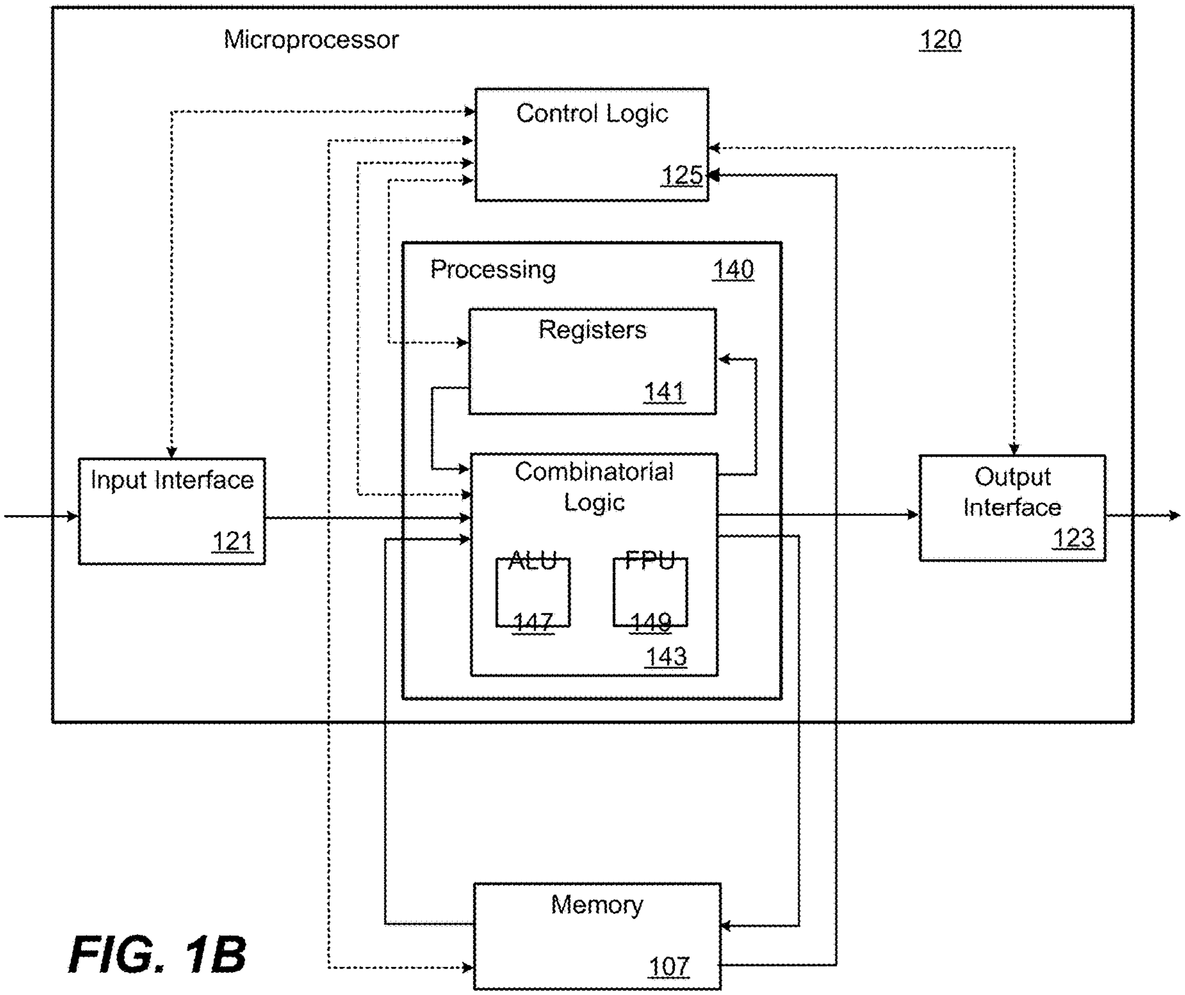

FIGS. 1A and 1B are block diagrams of a computer system and a microprocessor such as can be incorporated into such a computer system. In the simplified representation of FIG. 1A, the computer system 100 includes a computer 105, one or more input devices 101 and one or more output devices 103. Common examples of input devices 101 include a keyboard or mouse. Common examples of output devices 103 include monitors or printers. The computer 105 includes memory 107 and microprocessor 120, where in this simplified representation the memory 107 is represented as a single block. The memory 107 can include ROM memory, RAM memory and non-volatile memory and, depending on the embodiment, include separate memory for data and instructions.

FIG. 1B illustrates one embodiment for the microprocessor 120 of FIG. 1A and includes the memory 107. In the representation of FIG. 1B, the microprocessor 120 includes control logic 125, a processing section 140, an input interface 121, and an output interface 123. The dashed lines represent signal paths for carrying control signals exchanged between the control logic 125 and the other elements of the microprocessor 120 and the memory 107. The solid lines represent signal paths for carrying the flow of data and instructions within the microprocessor 120 and between the microprocessor 120 and memory 107.

The processing block 140 includes combinatorial logic 143 that is configured to execute instructions and registers 141 in which the combinatorial logic stores instructions and data while executing these instructions. In the simplified representation of FIG. 1B, specific elements or units, such as an arithmetic logic unit (ALU) 147, floating-point unit (FPU) processor 147, and other specific elements commonly used in executing instructions are not explicitly shown in the combinatorial logic 143 block. In one embodiment, the ALU 147 includes the accumulator described herein below. The combinatorial logic 143 is connected to the memory 107 to receive and execute instruction and supply back the results. The combinatorial logic 143 is also connected to the input interface 121 to receive input from input devices 101 or other sources and to the output interface 123 to provide output to output devices 103 or other destinations.

The following considers the calculation of floating-point dot-products, such as in the FPU 147 of FIG. 1B. More generally, the techniques presented can more generally be applied to embodiments for central processing units (CPUs), graphic processing units (GPUs), an artificial intelligence (AI) accelerators, Tensor Processing Units (TPUs), or other digital logic that calculates floating-point dot-products.

The dot product is a basic computation of linear algebra and is commonly used in deep learning and machine learning. In a single layer of a basic neural network, each neuron takes a result of a dot product as input, then uses its preset threshold to determine the output. Artificial neural networks are finding increasing usage in artificial intelligence applications and fields such as image and video recognition, recommender systems, image classification, medical image analysis, natural language processing, expert systems, autonomous (self-driving) vehicles, data mining, and many other applications. An artificial neural network is formed of a large number of layers through which an initial input is propagated. At each layer, the input will be a vector of values that is multiplied with a vector of weights as a dot-product to provide an output for the layer. Such artificial neural networks can have very large numbers of layers (network depth) and involve large numbers of dot-products within each of layer (network width), so that propagating an input through a network is extremely computationally intensive. In the training of an artificial neural network (i.e., the process of determining a network's weight values), a number of inputs are typically required to be repeatedly run through the network to determine accurate weight values. Given the increasing importance of artificial networks, the ability to efficiently compute large numbers of dot-products is of great importance.

Figure 2:
FIG. 2 illustrates a floating-point number format.

FIG. 2 illustrates a floating-point number format. Conventionally, computing speed is measured in flops (floating-point operations per second). This assumes that an entire computation is reduced to the four elementary floating-point operations (e.g., +, −, . and /). Other compound operations, such as accumulate or multiply and accumulate, allow for continuous accumulation of numbers and of products of numbers into different positions of a wide fixed-point register. For purposes of example, if we assume that a double-precision floating-point (FP) number is represented by a 64-bit word, then one (1) bit is used for the sign s, eleven (11) bits are used for the exponent e, fifty-two (52) bits are used for the fraction f (or significand fraction f (mantissa)), and one (1) bit for the implied leading l's bit (which is not actually stored) representing the integer value to the left of the fraction.

Figure 3:
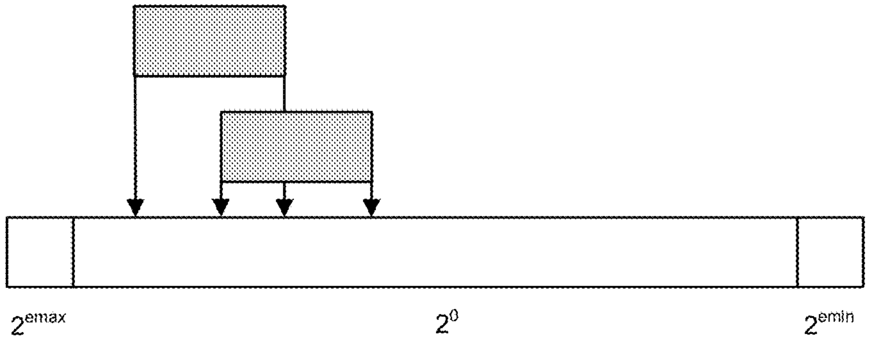
FIG. 3. Illustrates a Kulisch long accumulator.

FIG. 3. Illustrates a Kulisch long accumulator. The Kulisch Accumulator uses an exact multiplier, which is a classical multiplier with the rounding and normalization logic removed. Instead, a very wide fixed-point accumulator is used whose bits cover the full exponent range of a product. For single precision, the weights of the bits can range from $2^{-126-23}=2^{-149}$ to $2^{127}$. Multiplying two such single-precision numbers produces a product with a range from $2^{-298}$ to $2^{254}$, which is a range of 552 bits. Kulisch also proposed to add more bits to absorb possible temporary overflows. In the Kulisch Accumulator proposal, the fixed-point result is in sign-magnitude format.

In the Kulisch long accumulator (also referred to commonly as a superaccumulator), the length of the accumulator is chosen such that every bit of information of the input format can be represented (e.g., binary 64). This covers the range from the minimum representable FP value to the maximum value, independently of the sign. For example, the depicted Kulisch accumulator utilizes an accumulator of 4288 bits to handle the accumulation of products of 64-bit FP values. The addition is performed without loss of information by accumulating every FP input number in the long accumulator. The accumulator produces the exact result of a very large amount of FP numbers of arbitrary magnitude. However, this technique may suffer from very large memory overhead.

Figure 4:
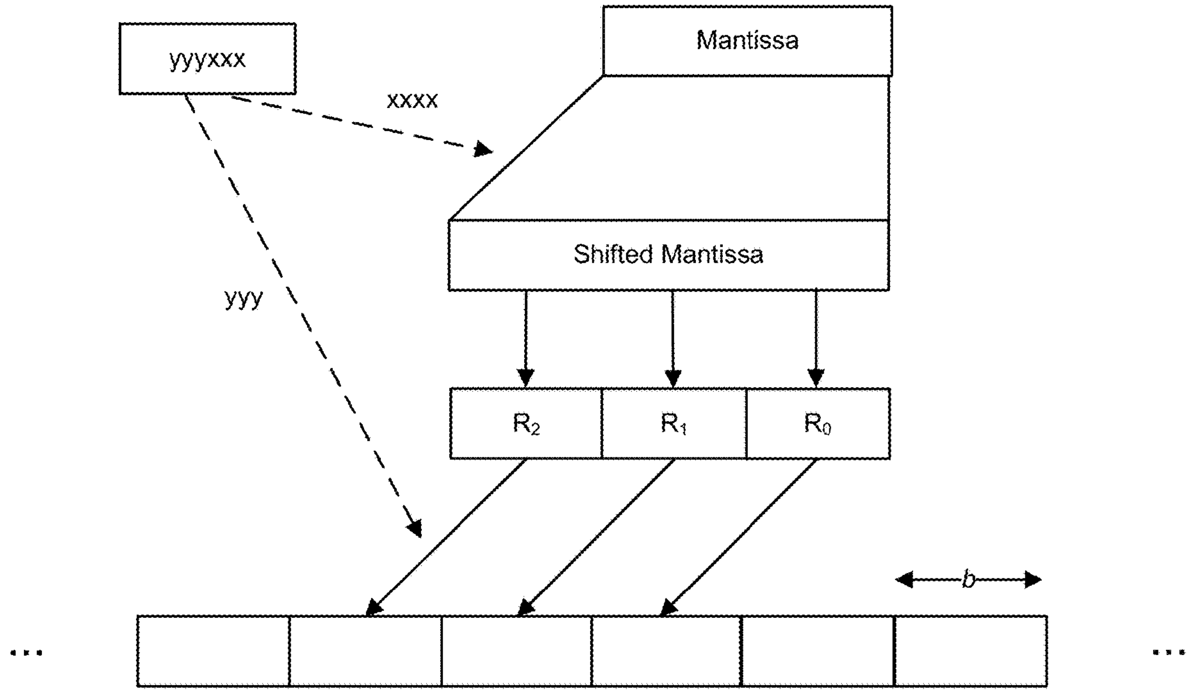
FIG. 4 illustrates an accumulator in which a mantissa is shifted into sub-words of the long accumulator of FIG. 3.

FIG. 4 illustrates an accumulator in which a mantissa is shifted into sub-words of the long accumulator of FIG. 3. This version of the Kulisch accumulator divides the shift operation into two—selecting the words to which to send a mantissa product, and then shifting within a word. The shifted product may span multiple accumulator words. An advantage to this version is that smaller and faster sub-adders may be used to add the product to the accumulator within each word of the product. Disadvantages are that time-consuming carry-propagation is necessary to update all of the words above the target words and that the carry propagation becomes a sign-management issue requiring borrow propagation in certain cases of effective subtraction.

In the depicted architecture, there are $N=[w_a/b]$ words, where b is the number of bits. The shift operation is then decomposed into two—selecting the words in which to send a mantissa and shifting withing a word. If b is chosen as a power of two, $b=2^k$, the intra-word shift distance is simply obtained as the k lower bits of the exponent, while the word address is obtained as the $w'_e-k$ leading bits. The shifted mantissa will typically be spread across multiple words.

More specifically, after a shift of maximum size b−1, the shifted mantissa is of size $w'_f-1+b$ and is spread over $$\left\lceil \frac{w'_f - 1 + b}{b} \right\rceil$$

words. Using this technique, the two steps of the shift can be executed in parallel, and accumulating an input only requires adding it to S words (in the depicted example, S=3 such that the shifted mantissa spans three words). However, there are a few disadvantages. There is a carry propagation from one accumulator word to the next, which potentially requires to update all the words above the S target words. Additionally, there is a sign management issue. As input mantissa may be signed, they need to be either added or subtracted to the accumulator. In the case of subtraction, there is an issue of borrow propagation.

Figure 5:
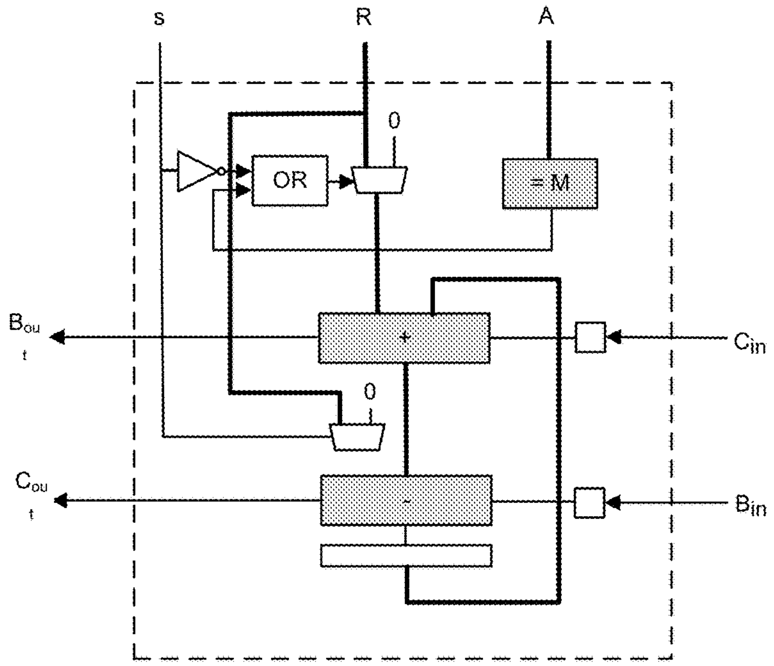
FIG. 5 illustrates an example sub-adder in carry/borrow form used in the accumulator of FIG. 4.

In one embodiment, the accumulator of FIG. 4 uses a sub-adder in carry/borrow form, as shown in FIG. 5. As illustrated, the 'A' represents the accumulator registers in FIG. 4, each of which are divided into b-bit words M (e.g., 32-bits). 'R' is the product mantissa that is added to the accumulator 'A' 'and 's' is the sign. $C_{in}$ and $B_{in}$ are the carry and borrow bit inputs, respectively, and $C_{out}$ and $B_{out}$ are the carry and borrow bit outputs, respectively. Accordingly, in this sub-adder, the accumulation adds one mantissa sub-word, one carry bit and one borrow bit. Each sub-adder in the accumulator therefore performs both one addition and one subtraction in one cycle. In another embodiment, the accumulator of FIG. 4 uses a sub-adder in two's complement form (not shown).

Figure 6:
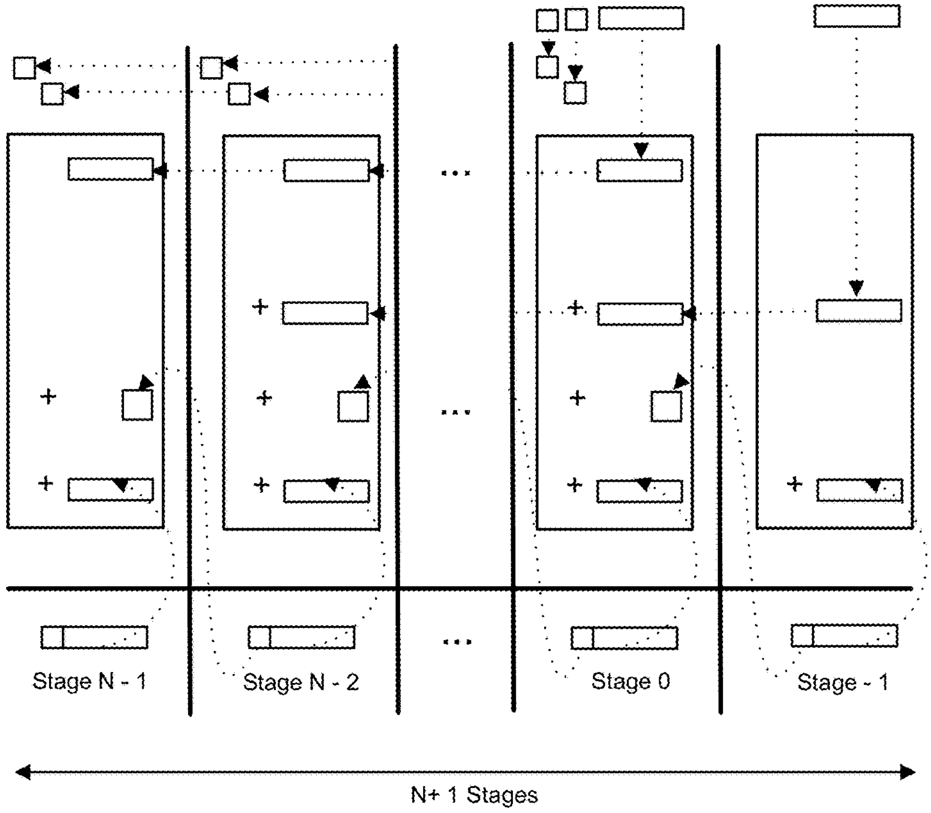
FIG. 6 illustrates a pipelined accumulator.

FIG. 6 illustrates a pipelined accumulator. In the diagram, the pipelined stages are separated by vertical lines, the terms to add and result of the summation are separated by the horizontal lines, and the dotted arrows represent the data propagation between stages of each clock cycle.

The S words of the shifted mantissa are sent to the stages to the right (numbered −S+1 to 0). The pipeline also transmits the mantissa sign, as well as the stage where the mantissa needs to be added. The stages between stage 0 and stage N−S are identical. The S mantissas are added in the current sub-adder whose stage match, plus the carry from the previous stage. The result of the sum is computed over b+log 2(S+2) bits, where b lower bits of the results are kept in the current sub-adder and the log 2(S+2) higher bits are the carry sent to next stage. On both ends of the pipelines, there are S−1 stages that perform the same computation but with fewer terms to sum, as illustrated.

While the pipelined accumulator pipelines the carry-propagation, this requires N additional 'null' cycles after the end of an accumulation with zero input to propagate the carries. For example, the N for a double-precision calculation is sixty-four (64).

Figure 7:
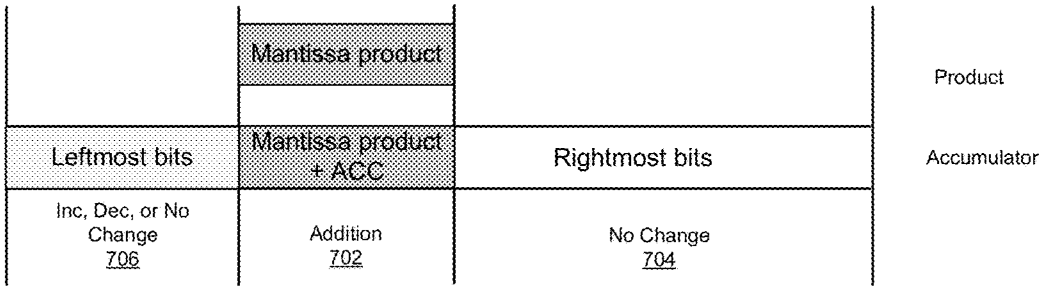
FIG. 7 illustrates a general overview of summation in the accumulator of the disclosure.

FIG. 7 illustrates a general overview of summation in the accumulator of the disclosure. In the disclosed embodiments, there is no need to produce a sum over the entire width of the accumulator. This contrasts with the conventional art, in which for each word there is an adder and an accumulator (i.e., register). Instead, with an accumulator segmented into words, the maximum number of bits to be added is the mantissa product width plus the maximum shift amount within an accumulator word. That is, instead of the mantissa product being shifted and added to the full-width accumulator word by a series of segmented adders (conventional art), the mantissa product is shifted and added to a selected number of accumulator words. For example, with reference to the diagram, when accumulator words are being added (addition 702), bits to the right of the added accumulator words are not updated (no change 704). Bits to the left of the added accumulator words request either incrementing decrementing or no change (not full addition) 706, depending on various conditions.

In one embodiment, and with reference to FIG. 9B (described below in more detail), the accumulator uses accumulator stages of ACC, ACC+1 and ACC−1 to update the left-most accumulator words in a single cycle. Instead of shifting the product (e.g., the product of $A_{mant}$ and $B_{mant}$) and adding it to the accumulator words, the product is added to selected words of the accumulator. That is, the mantissa product is shifted and added to a selected number of accumulator words. This allows the maximum adder width to be the product width plus the maximum shift amount within a word. Instead of having to carry or borrow words to the left of the product, the product is either incremented or decremented (or no change) without full addition. In one embodiment, the dedicated ACC−1 and ACC+1 register words are used to maintain ACC−1 and ACC+1 values. In one other embodiment, the adder is two bits wider than the product width to allow for a sign bit and additional sum bit. When the sign of the adder sum is negative, the ACC words to the left of the adder are loaded with the ACC−1 word values to represent a borrow. When the sign of the adder sum is positive, but there is a carry into the most-significant sum bit, the ACC words to the left of the adder are loaded with the ACC+1 word values to represent a carry.

Figure 8A:
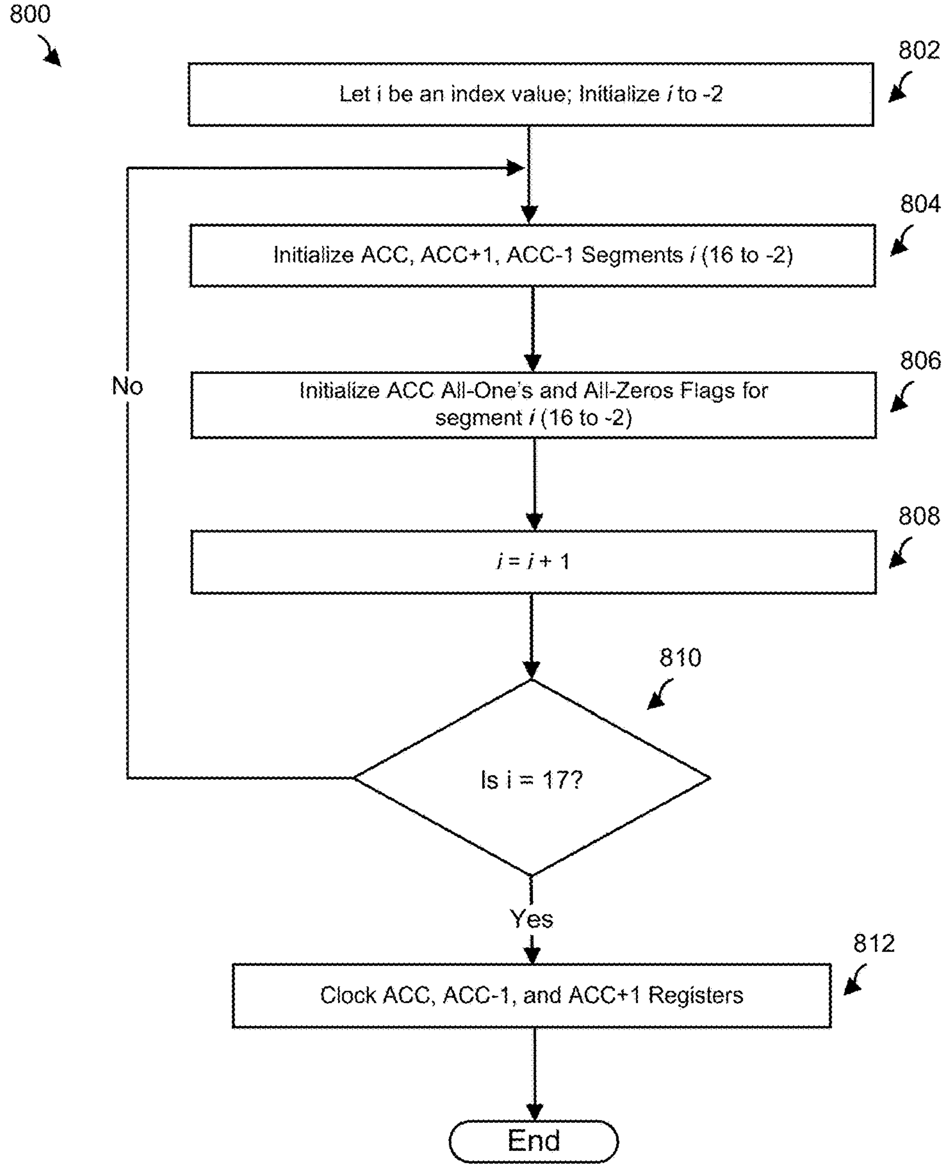
FIGS. 8A and 8B illustrate example flow diagrams of the process of the accumulator disclosed in FIGS. 9A and 9B.
Figure 8B:
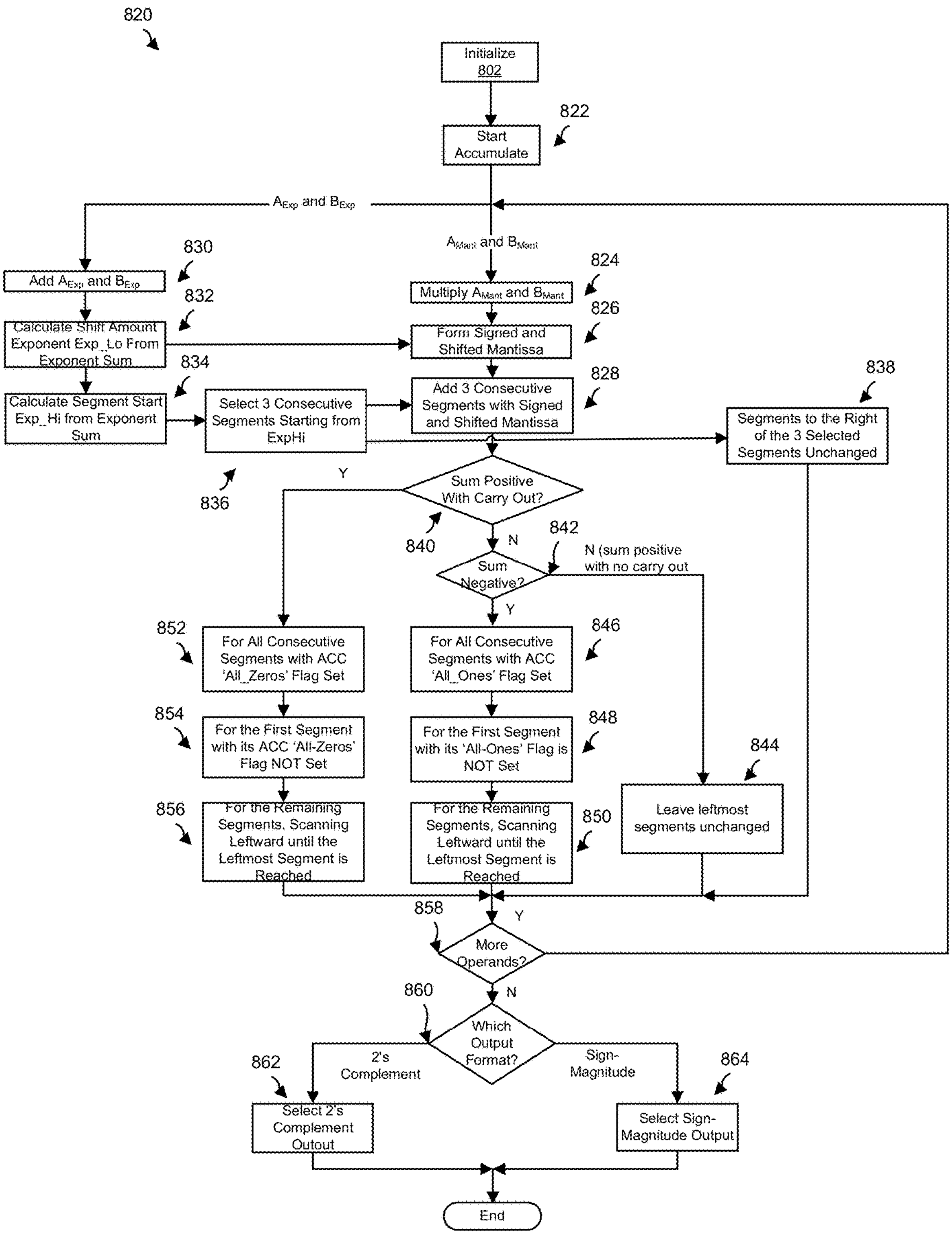
Figure 9A:
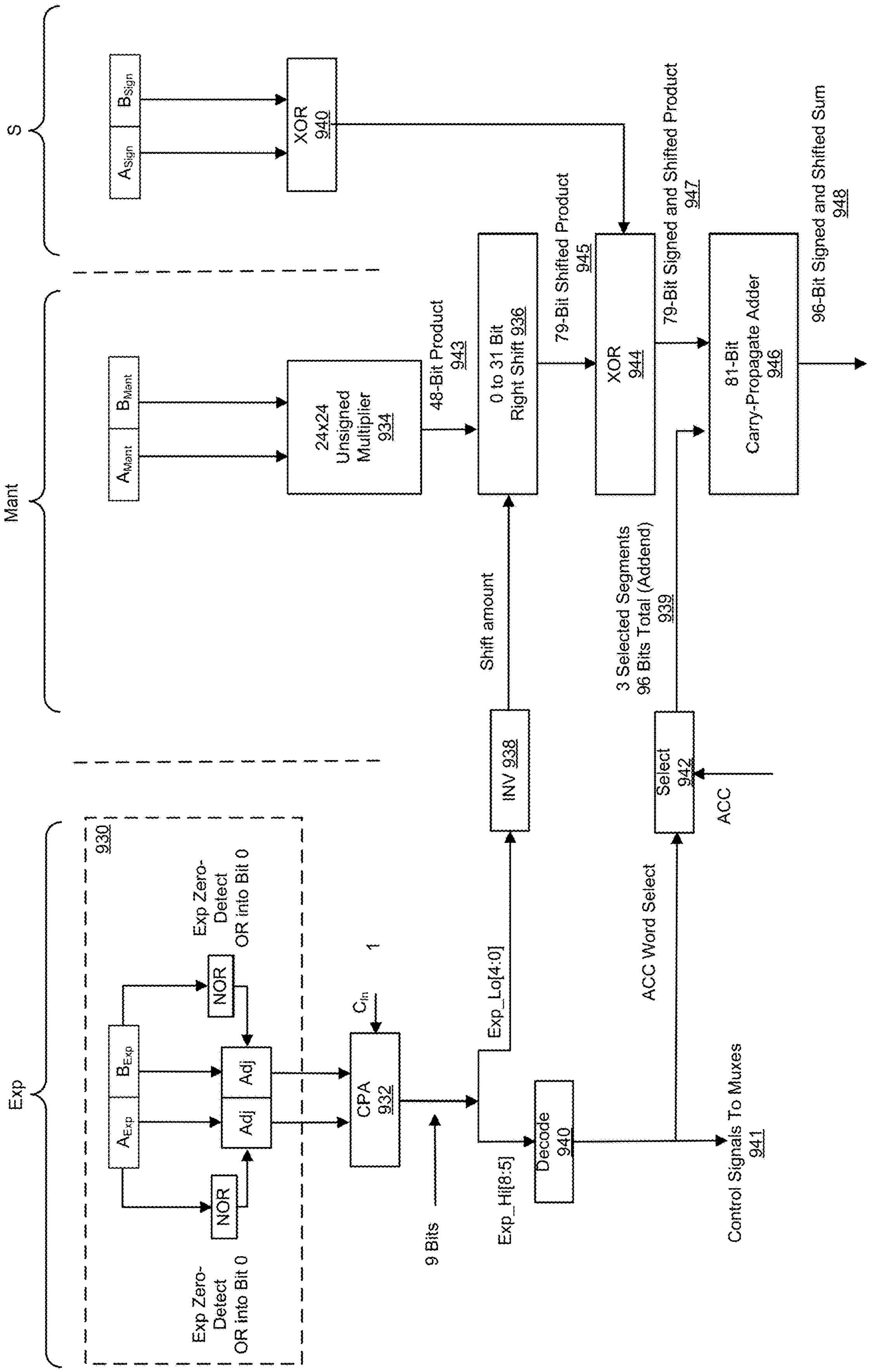
FIGS. 9A and 9B illustrates an example accumulator in accordance with the disclosed embodiments.
Figure 9B:
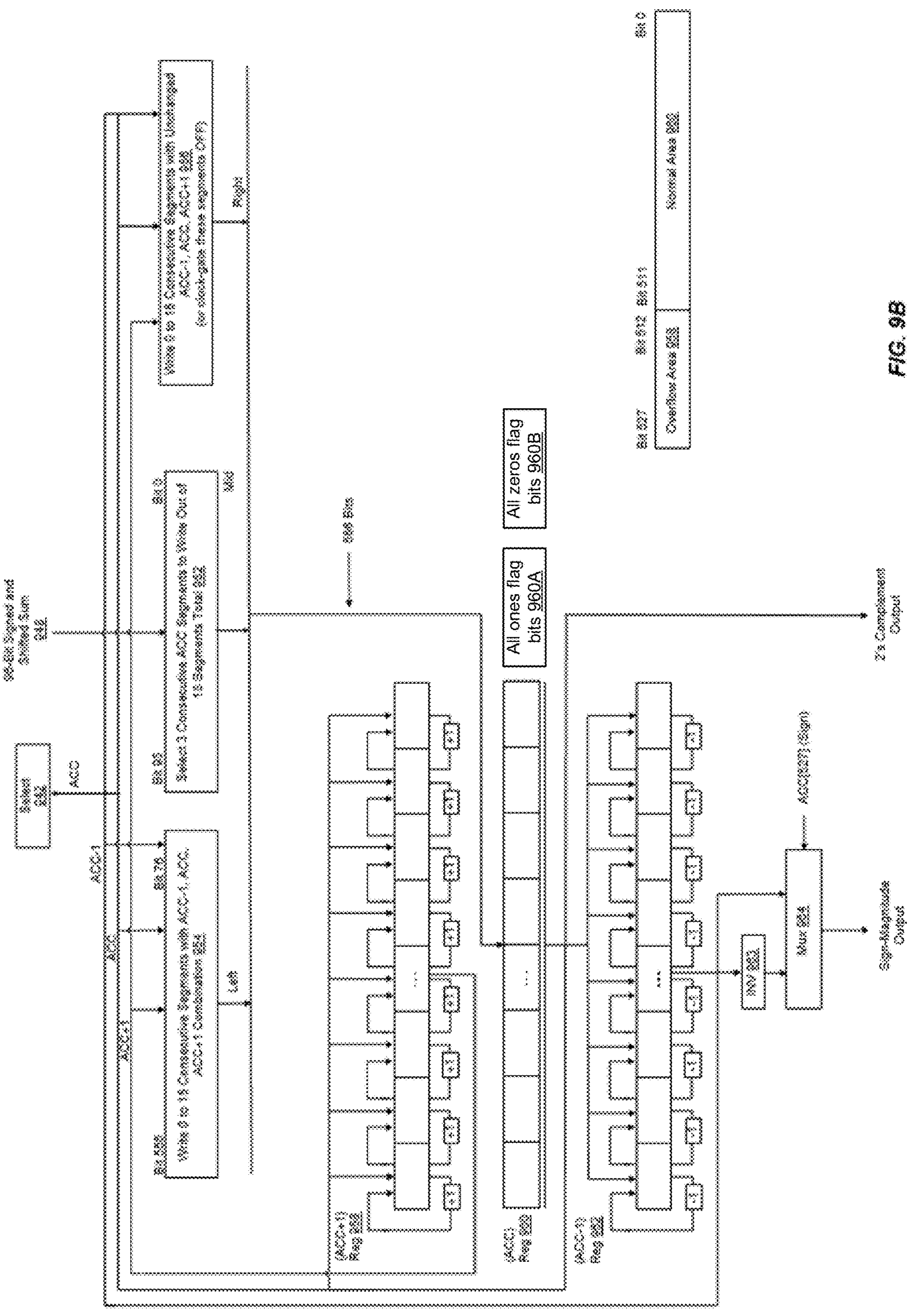

FIGS. 8A and 8B illustrate example flow diagrams of the process of the accumulator disclosed in FIGS. 9A and 9B. In particular, FIG. 8A represents the flow of the process of initializing the disclosed accumulator, and FIG. 8B represents the flow of the process of accumulating using the disclosed accumulator. Specifically, the flow depicted in FIG. 8B describes how a dot-product is computed in a single cycle. For example, the dot-product is computed using a Kulisch accumulator that allows for removal of sources of rounding errors in a sum of products. In one embodiment, the process of FIG. 8B allows the accumulator, which contains an entire floating-point range, to add a single product to the accumulator every cycle. In the discussion that follows, the ALU 147 (which includes the accumulator as detailed in FIGS. 9A and 9B) performs the process. However, it is appreciated that any other functional unit or processing unit may implement the processes described herein, and the disclosure is not limited to implementation by the ALU.

Turning to FIG. 8A, the flow diagram illustrates process 800, which is an initialization of the accumulator to zero operation (or a processor reset). The accumulator ACC, ACC+1 and ACC−1 (and corresponding registers and their associated input selector multiplexors 958, 960 and 962, and flag bits 960A and 960B) are depicted in FIG. 9B. As shown in the example embodiment of FIG. 9B (described below in more detail), nineteen (19) segments (segments 16 to −2) are written into the accumulator registers, with each segment except the least-significant segment being 32-bits (bits 0-587). It is appreciated that any number of segments and bits may be used and that the depicted embodiment is one example embodiment.

Initialization begins at step 802 where an index value i is initialized to −2.

Initialization of the next segment (segment i, where i is initially set to −2 as in step 802) of the accumulator registers for the ACC registers 960, ACC+1 registers 958 and the ACC−1 registers 962 is then performed at step 806. For example, the ACC+1 registers 958 in segment i are initialized to 0x0000_0001, the ACC registers 960 in segment i are initialized to 0x0000_000 and the ACC−1 registers 962 in segment i are initialized to 0xFFFF_FFFF. At step 806, the ACC register "All-one's" and "All-zeros" flags for segment i are initialized (as described above) and the index value i is incremented by 1 (i=i+1) at step 808.

At step 810, the index value i is checked to determine if it is equal to 17, which indicates that all 19 segments (segments 16 to −2) have been initialized. If i=17, then initialization of segments 16 to −2 have been completed, and the process proceeds to step 812, where the accumulator registers ACC, ACC+1 and ACC−1 are clocked. Otherwise, if the index value i<17, then not all of the segments have been initialized and the process returns to step 804 for continued processing.

Turning now to FIG. 8B, the flow diagram illustrates process 820, which details the accumulate process flow that occurs in the ALU 147. The process 820 will also be discussed with reference to FIGS. 9A and 9B, which illustrate a detailed example of a single-cycle accumulator in accordance with embodiments of the disclosure. As the name indicates, the described architecture allows for a dot-product to be computed in a single cycle across a wide range of technologies. In the disclosed example, a single-precision 32-bit floating-point (FP) number accumulator is used for purposes of discussion. It is appreciated that any other type of precision may be used, such as a double-precision format or a half-precision format. The accumulator begins at step 822 after initialization at step 802.

Source operands A and B (also referred to herein as Src0 and Src1) are received and stored in registers or memory. These inputs may be for any number of different operations, including use in high performance computing (HPC), CPU's, GPU's, deep learning or neural networks, artificial intelligence, etc. The exponents $A_{Exp}$ and $B_{Exp}$ for each source operand may be sent to a multiplier where they may be added component by component. The mantissa $A_{mant}$ and $B_{Mant}$ of each source operand may be sent to a mantissa multiplier for component-wise multiplication. The product for each of the components exponents is then split into a lower part and a higher part. For example, the exponents may be M bits, which is then split into a product consists of a high exponent (Exp_Hi) and a low exponent (Exp_Lo). Additionally, a sign $A_{sign}$ and $B_{sign}$ are extracted from the source operands.

In one embodiment, each of the sign (s), exponent (Exp) and mantissa (Mant) operations may be performed concurrently, as separated by the dashed lines representing component paths for determining the sing, exponent and mantissa. For a single-precision accumulator, used for purposes of discussion throughout this disclosure, the sign is bit 31, the exponent is bits 30-23 and the mantissa is bits 22-0. Beginning with the exponents $A_{Exp}$ and $B_{Exp}$ in stage 930 (FIG. 9A), they are adjusted for denormals by performing a zero detect on the source exponent. The result of the NOR is OR'ed into bit 0 of the exponent, and an exponent of 0x00 will be adjusted to an exponent of 0x01, which is the correct exponent value for a denormal. This is expressed as: Exponent[0]=Exponent[0] OR (NOR(Exponent[7:0])).

In step 830, each exponent $A_{Exp}$ and $B_{Exp}$ is then zero-extended by one bit, and the exponents are added with a 9-bit carry propagate adder (CPA) 932 (i.e., zero-extend $A_{Exp}$ bits [8:0]+zero-extend $B_{Exp}$ bits [8:0]=sum of the exponents, which is 9-bits [8:0]) with a carry-in ($C_{in}$) bit of '1.' From the 9-bit sum output from the CPA 932, the low and high bits are extracted. Specifically, bits [8:5] of the sum are extracted as the low exponent bits (Exp_Lo[4:0]), which may be used to calculate a shift amount from the exponent sum, at step 832. Bits [4:0] of the product are extracted as the high exponent bits (Exp_Hi[8:5]), which may be used to calculate a segment start, at step 834. The embodiments in the examples assume that the product of the exponents (ProductExp[8:0])=(Exp_Hi[8:5], ExpLo[4:0]). That is, the Exp_Hi and Exp_Lo are of equal widths. However, it is appreciated that these techniques are applicable to any combination of widths of Exp_Hi and Exp_Lo which total to the product of the exponents. Once the high and low exponents are extracted, a shift amount may be calculated by inverting (INV), with INV 938, the low exponent (NOT (Exp_Lo[4:0]), which is the equivalent of subtracting the low exponent from 31 bits. The high exponent will be used in step 834 to calculate a starting segment.

For the mantissa bits 23:0, a non-zero exponent represents a normal floating-point value and gets a leading mantissa bit of '1.' A zero exponent which represents a denormal floating-point value gets a leading mantissa bit of '0.' This is expressed as: Mantissa[23]=OR(exponent[7:0]).

At step 824, a multiplier, such as a 24×24 bit unsigned multiplier 934, multiplies two FP significands ($A_{Mant}$*$B_{Mant}$) to form a 48-bit unsigned product 943 (product[47:0]). The one's complement of the lower 5-bits of the product exponent are used to right-shift the 48-bit unsigned product by the shift amount calculated in step 832. The leftmost 4-bits of the product exponent are decoded to form 1-hot control bits (control signals) into multiplexers (MUXes) and shifters, such as a barrel shifter (not shown). In the present example, the maximum shift amount of the significand is 31-bits. Thus, the total output width of the shifter is 48 bits+31 bits=79 bits. Specifically, the 79-bit shifted product 945 is created by right shifting the signed mantissa by the shift amount (Shifted_Product[78:0]=Signed_Mant[47:0]>>Shifted Amount[4:0])).

Although not shown in FIG. 8A, the product sign bits $A_{sign}$ and $B_{sign}$ are also extracted. The sign bit for each product is determined based on whether the product is positive or negative, where a negative sign is equal to '1' and a positive sign is equal to '0.' The product sign bits are used to sign the 79-bit shifted product 945 at step 826. In one embodiment, if the product sign is negative, then a 2's complement of the product is created. If the product sign is positive, then the positive (original) version of the product is used. Specifically, the 79-bit shifted product 945 is signed by XORing the product sign bits $A_{sign}$ and $B_{sign}$ with the XOR 944 to form the sign of the product (the 79-bit signed and shifted product 947, which occurs after shifting the 79-bit product 945).

At step 836, three consecutive segments of the accumulator to be added to the 79-bit signed and shifted product 947 are selected using word selector 942. As shown in FIG. 9A, the three selected segments have a total of 96-bits 939 and are used as input into the 81-bit carry-propagate adder (CPA) 946. In one embodiment, a decoder 940 decodes the product exponent leftmost bits (Exp_Hi[8:5]), which are used to select the 32-bit segments of the accumulator to be added to the incoming product (i.e., the 79-bit signed and shifted product 947). These three selected segments 939 may also be referred to herein as the Addend, and are selected by the high exponent (Exp_Hi[3:0], Exp_Hi[3:0]−1, and Exp_Hi [3:0]-2). Thus, the Addend[95:0]={ACC[ExpHi[3:0]], ACC [ExpHi[3:0]-1], ACC[ExpHi[3:0]-2]}. The Addend 939 and the 79-bit signed and shifted product 947 are then sign-extended by 2 bits into the 81-bit carry-propagate adder 946 to form a 79-bit sum and a sign-bit and a carry-out bit. The sign-bit is the MSB and the carry-out-bit is the MSB−1 output of adder 946 (bits 80 and 79, respectively).

The 96-bit signed and shifted sum 948 is written into the selected three consecutive ACC segments 952 (or 'Mid' segment) of the accumulator, as shown in FIG. 9B. All bits to the 'Right' (segment 956) of the Mid segment 952 are written back with unchanged ACC, ACC+1, or ACC−1 register values at step 838. Bits to the 'Left' (segment 954) of the 79-bit sum are written back with either ACC, ACC+1, or ACC−1 register values, on 32-bit word boundaries.

The sum being written into the 3 segments of the accumulator ACC from the 96-bit signed and shifted sum 948 is represented as the following: 1) ACC[ExpHi[3:0]][31:0]=Sum[95:64], 2) ACC_In[ExpHi[3:0]-1][31:0]=Sum[63:32], and 3) ACC_In[ExpHi[3:0]-2][31:0]=Sum[31:0]. Segments written to the right (right segment 956) of the mid segment 952 are written with the previous value of the ACC (these bits will be unchanged in the next clock cycle.

For segments to the left (left segment 954) of the mid segment 952, ACC, ACC+1, or ACC−1 values are selected to be written back to the accumulator. The values ACC, ACC+1 and ACC−1 are maintained in registers 958, 960 and 962, respectively, as illustrated in FIG. 9B. For each segment in ACC, there exists two flag register bits, one titled 'All-Zeros' and one titled 'All_Ones'. Both the 'All-Zeros' and 'All-Ones' flag bits represent the value contained in the corresponding ACC segment. The flags are register bits which represent the state of the accumulator register segments. Whenever the ACC register segments are updated, each of their corresponding flag register bits are updated as well, described further below.

In the illustrated example of FIG. 9B, in which single precision is used, each of the ACC, ACC+1, and ACC−1 are composed of an overflow area 958 of 32 bits (which allow for temporary storage of values greater than a maximum product exponent ($E_{Max}=2^{254}$ for single-precision)) and sixteen segments of 32-bits each (which represent the normal area 960 of the exponent range of accumulator values).

Continuing with reference to FIG. 8B, the combination of the sign and carry-out from ALU 147 and the All-Zeros and All-Ones ACC register flags for each segment determines how to set each of the ACC+1, ACC and ACC−1 registers 958, 960 and 962. Initially, an index value i is set to the high exponent (Exp_Hi[3:0]+1) of the Addend 939, such that i=Exp_Hi[3:0]+1.

At step 840, if the 96-bit signed and shifted sum 948 is positive with a carry-out, then the process proceeds to step 852. At step 842, if the 96-bit signed and shifted sum 948 is negative, then the process proceeds to step 846. At step 842, if the 96-bit signed and shifted sum 948 is positive with no carry-out, then the process proceeds to step 844.

At step 852, for all consecutive segments with the ACC "All Ones" flag set (starting at segment i) and incrementing i until and including the first segment with its "All Ones" flag is NOT set, at step 854) perform the following operations: copy the ACC+1 segments 958 into the ACC segments 960, copy ACC segments 960 to the ACC−1 segments 962, increment the ACC+1 segments 958 and calculate new 'All ones' and 'All zeros' flags based on the value of the ACC register segments.

Continuing step 856, the index value i is continually incremented by 1 (i=i+1). If i<17, then the ACC, ACC+1, and ACC−1 register segments corresponding to each index i is left unchanged, either by loading each register segment from itself or by clock-gating each segment OFF. When i=17, then the process proceeds to step 858 to process more operands.

At step 846, for all consecutive segments with the ACC "All Zeros" flag set (starting at segment i) and incrementing i until and including the first segment with its "All Zeros" flag is NOT set, at step 848) perform the following operations: copy the ACC−1 segments 962 into the ACC segments 960, copy ACC segments 960 to the ACC+1 segments 958, decrement the ACC−1 segments 962 and calculate new 'All ones' and 'All zeros' flags based on the value of the ACC register segments.

Continuing step 850, the index value i is continually incremented by 1 (i=i+1). If i<17, then the ACC, ACC+1, and ACC−1 register segments corresponding to each index i is left unchanged, either by loading each register segment from itself or by clock-gating each segment OFF. When i=17, then the process proceeds to step 858 to process more operands.

At step 844, the index value i is continually incremented by 1 (i=i+1). If i<17, then the ACC, ACC+1, and ACC−1 register segments corresponding to each index i is left unchanged, either by loading each register segment from itself or by clock-gating each segment OFF. When i=17, then the process proceeds to step 858 to process more operands.

When the process reaches step 858, the ALU 147 determines whether any additional operands require being multiplied and added to the accumulator. If there are additional operands, then the process returns to step 822 and restarts the accumulate process. If no further operands remain, then the process proceeds to step 860 in which to determine the output format—either two's complement output 862 or sign-magnitude output 864. If the two's complement output 862 is selected, the output may be taken directly from the ACC register 960 (the 556 bits from the accumulator as shown in FIG. 9B). If the sign-magnitude output 864 is selected, the output is taken from a multiplexer (MUX) 964 of the ACC register 960 (for positive values) and the one's complement (inverted ACC−1 register by INV 963) of the ACC−1 register 962 (for negative values). In either case, the rounding errors of the sum of products are removed from the input sources.

Accordingly, using the accumulator of the discloses embodiments, (1) a portion of the accumulator register may be selected such that is it added to an incoming product. This is in contrast to conventional techniques of shifting a product and adding it to the accumulator register; (2) a single adder (CPA) may be employed instead of multiple adders; (3) ACC+1 and ACC−1 registers are used in addition to the ACC registers, which allows for fast updating of carry and borrow to the left of the accumulated sum; and (4) a sign-magnitude output may be formed by inverting the ACC−1 register instead of requiring an increment of the ACC registers, which is time consuming.

Figure 10B:
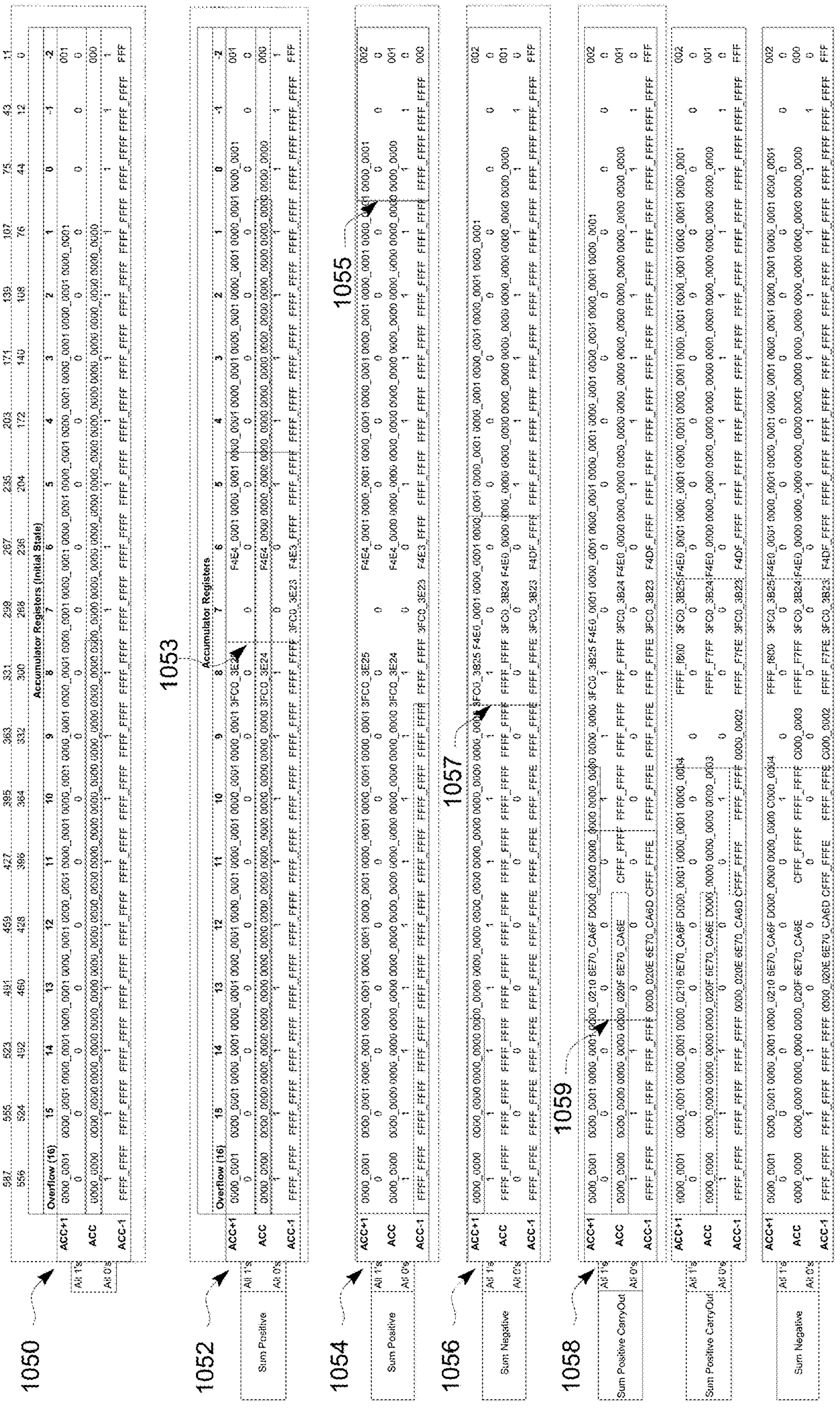

FIGS. 10A and 10B illustrate an example of storing values in registers of the accumulator of FIGS. 9A and 9B. In the disclosed example, and for purposes of discussion, a single precision accumulator with operand sources of 8 hexadecimal digits are disclosed. Each cell is a segment that is 32-bits wide and have an overflow segment, as illustrated. The accumulator is a 588-bit accumulator register; 512-bits for normal floating-point products, 32-bits for overflow, and 44 bits for possible denormal products.

With reference to FIG. 10B, before any floating-point calculations are performed, the accumulator registers ACC+1, ACC and ACC−1 are initialized at block 1050. The ACC registers are initialized with all zeros, the ACC+1 registers are initialized with all zeros plus 1 and the ACC−1 registers are initialized with all zeros minus 1. Accordingly, when 1 is subtracted from the ACC register, the ACC−1 register is set to all 0xFFFFFFF, and when 1 is added to the ACC register, the ACC+1 register is set to all 0x0000001. Each segment is incremented or decremented individually. Additionally, a flag is set for each segment to detail whether the segment value is 'All zeros" or "All ones."

Turning back to FIG. 10A, a table with operands 1-6 is illustrated. Each operand (block 1002) has two sources—Src0 (block 1004 of operand 1) and Src1 (block 1006 of operand 1), each of which are floating-point values. Each floating-point value consists of a sign, an exponent and a mantissa, where the first bit is the sign, the next 8 bits are the exponent and the remaining bits are mantissa. Operand Src0 has a hex value equal to 0x3F901234, with a positive sign (Src0_sign=0), an exponent value of 0x7F (Src0_Exp=0x7F) and a mantissa of 0x801234 (Src0_Mant=0x801234). Similarly, operand Src1 has a hex value equal to 0xFEDCBA, with a positive sign (Src1_sign=0), an exponent of 0x7F (Src1_Exp=0x7E and a mantissa of 0xFEDCBA (Src1_Mant=FEDCBA). A product of the Src0_Mant and the Src1_Mant is 7F80 7C49 E9C8 (block 1008 of operand 1). A sum of the exponents of Src0_Exp (0x7F) and the Src1_Exp (0x7E)+1 is 0xFE, where the high exponent (Exp_Hi, which is the leftmost 4-bits) and low exponent (Exp_Lo, which is the lower 4-bits) may be extracted from the product of the exponents (block 1010 of operand 1). In the depicted embodiment, Exp_Hi equals 7 and Exp_Lo equals 30. In this case, the Exp_Hi indicates which segment to start writing the mantissa product. A shift amount (block 1012 of operand 1) of 30 is determined by subtracting the low exponent from 31 (31−Exp_Lo=1). As shown in block 1014, the start segment is the high exponent (Exp_Hi=7).

With reference to FIG. 10B and block 1052, the three segments starting at segment 7 (block 1053), with a shift amount of 1 to the right, have values of n (0x3FC0 3E24), n+1 (0xF4E40000) and n+2 (0000) that are written into the accumulator (i.e., into the accumulator of block 1052). That is, the values form the shifted mantissa value, which are then selected and copied into the three segments (block 1053) of the ACC registers in block 1052. The ACC+1 registers and the ACC−1 registers of block 1052 are then shifted by '1' and the registers are updated (in this case by copying the registers of the initialized accumulator). Specifically, the area to the right (right segments) of the three segments (block 1053) are unchanged areas. That is, all values of previous accumulator registers are selected and copied into the current accumulator registers without any change. The area to the left (left segments) of the three segments (block 1053) are also copied from the previously accumulator directly into the current accumulator since there is no carryout, as indicated by the sum of the 81-bit adder positive, indicated by the MSB of the output of the adder. The flag bits are also updated to reflect the values in each of the segments.

Turing to operand 2, Src0 and Src1 equal 0x00000001 with a positive sign of 0, an exponent of 0 and a mantissa of 0x000001 (blocks 1004 and 1006 of operand 2). The product of Src0_Mant and Src1_Mant is calculated as 0x0000_0000_0001, and the product exponent is 0x003 with Exp_Hi equal to 0 and Exp_Lo equal to 3 (block 1010 of operand 2). The shift amount is calculated as 28 (31−Exp_Lo, which is Exp_Low inverted) (block 1012 of operand 2), and the start segment is 0 such that the three segment values n, n−1 and n−2 are 0x0000_0000, 0x0000_0000 and 0x0010 (block 1014 of operand 2). The three segment values are added beginning at segment 0 (block 1054) and continuing into segments −1 and −2. Since the sum is positive (sign=0), everything to the left (left segment) of three segments (mid segment, block 1053) is selected and copied from the previous accumulator values (copied from block 1052).

Turning to operand 3, Src0 equals 0x40000001 with a negative sign of 1, an exponent of 80 and a mantissa of 80001 (block 1004 of operand 3), and Src1 equals 0x40000001 with a positive sign of 0, an exponent of 80 and a mantissa of 0x80001 (block 1006 of operand 3). The mantissa product and the product exponent (Exp_Hi and Exp_Lo) are calculated (blocks 1008 and 1010 of operand 3), and the shift amount (block 1012 of operand 3) is determined to be 30 (31−Exp_Lo, which is Exp_Low inverted). The product exponent-10 bits 2's complements (biased) and the product exponent (unbiased) are also calculated in blocks 1008A and 1008B. The product of Src0_Mant and Src1_Mant is calculated as 4000_0100_0001 (block 1008 of operand 3), and the product exponent is 0x101 with Exp_Hi equal to 8 and Exp_Lo equal to 1 (block 1010 of operand 3). The shift amount (block 1012 of operand 3) is calculated as 30 (31−Exp_Lo, which is Exp_Low inverted), and the start segment is 8 such that the three segment values n, n+1 and n+2 are 0xFFFF_FFFE, 0xFFFF_FCFF and 0xFFFC (since the sum is negative, we take the 2's complement of the mantissa product to get the segment values) (block 1014 of operand 3). However, in this case, the sum is negative (as indicated by the sign=1) such that the 'n+1' ACC−1 segments are selected and copied into the segments to the left (left segment) of the three selected registers (block 1057 of operand 3), where 'n' represents the number of consecutive 'All zeros' segments immediately to the left of the added segments. For example, taking the three consecutive segments in block 1057, and adding the values n, n+1 and n+2 to get the new value to write into the accumulator in the mid segment (block 1057). The values of ACC registers in block 1054 are copied to the ACC registers (block 1056) and update flags are updated to "All ones." The value of ACC+1 and ACC−1 registers are respectively written into ACC+1 (values become all zeros) and ACC−1 (values become 0xFFFF_FFFE) in block 1056.

In one other embodiment, if the sum is positive with a carry-out, the 'n+1' ACC+1 segments to the left (left segment in block 1056) are selected for copying into the left segment registers of block 1058, where 'n' represents the number of consecutive 'All one's" segments immediately to the left of the added segments (block 1059).

It is appreciated that any number of segments and bits may be used for any floating-point format and that the depicted embodiment is but one example embodiment.

Any number of independent parameters may be selected to determine the configuration of a particular embodiment. For example, a designer may select the independent parameters to determine the configuration. More specifically, the configuration of the embodiment may be determined by the floating-point format selected, the total number of bits per product segment, and the number of bits in the overflow segment:

Number of bits in exponent, $n_{BE}$=exponent width of the floating-point format;

Number of bits in mantissa, $n_{BM}$=mantissa width of the floating-point format;

Number of bits in normal segment, $n_{BNS}$=segment width in bits (limited to a power of 2); and Number of bits in overflow segment, $n_{BOS}$.

A number of dependent parameters are calculated based on the values of the independent parameters:

Number of bits in product, $n_{BP}=2*n_{BM}$;

Number of bits in product exponent, $n_{BPE}=1+n_{BE}$;

Number of normal product segments, $n_{PS}=2^{n}{}_{BP}/n_{BNS}$;

Number of bits in normal product segments, $n_{BNPS}=2^{n}{}_{BP}$,

Maximum number of bits in additional segments due to denormals$=n_{BSD}=n_{BP}-1$;

Number of bits in exponent low, $n_{BEL}=\log_2(n_{BNS})$;

Number of bits in exponent high, $n_{BEH}=\log_2(n_{PS})$;

Maximum shift count $n_{MAXSHFT}=n_{BP}\ n_{BS}-1$; and

Number of segments selected to be added to product $n_{SEG}=\text{Ceiling}(n_{MAXSHFT}/n_{BNS})$.

In the depicted embodiment, the independent parameters are: $n_{BE}=8$, $n_{BM}=24$, $n_{BNS}=32$, and $n_{BOS}=32$.

In the depicted embodiment, the dependent parameters are: $n_{BP}=2*n_{BM}=2*24=48$, $n_{BPE}=1+n_{BE}=1+8=9$, $n_{PS}=n_{BP}/n_{BNS}=2^9/32=512/32=16$, $n_{BNPS}=2^{n}{}_{BP}=2^9=512$, $n_{BSD}=n_{BP}-1=48-1=47$, $n_{BEL}=\log_2(n_{BNS})=\log_2(32)=5$, $n_{BEH}=\log_2(n_{PS})=\log_2(16)=4$, $n_{MAXSHFT}=n_{BP}\ n_{BNS}-1=48+32-1=79$ and $n_{SEG}=\text{Ceiling}(n_{MAXSHFT}\ \ n_{BNS})=\text{ceiling}(79/32)=\text{ceiling}(2.46875)=3$.

Figure 11:
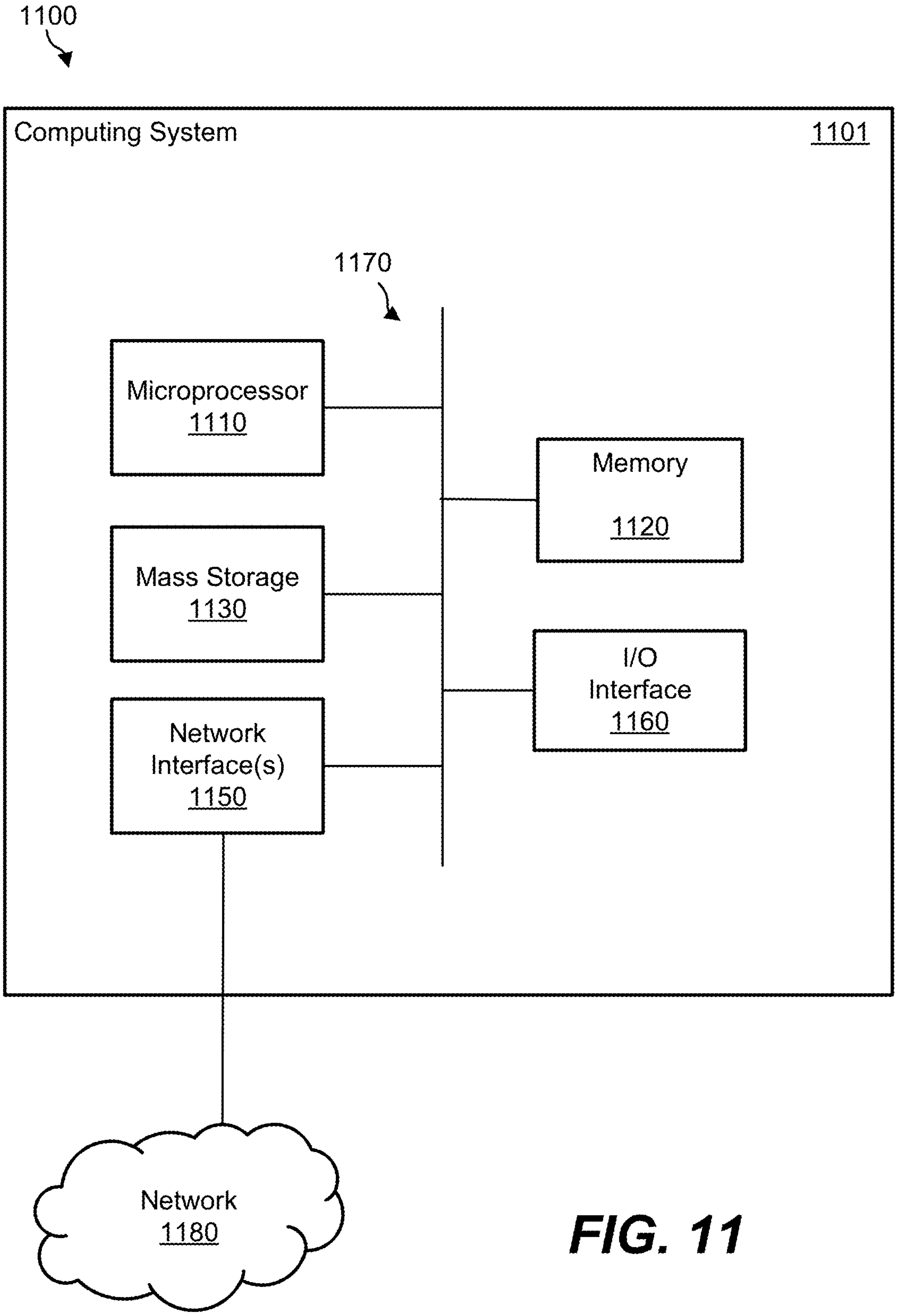
FIG. 11 is a high-level block diagram of a computing system that can be used to implement various embodiments of a microprocessor as presented in FIGS. 4-12.

FIG. 11 is a high-level block diagram of a computing system 1100 that can be used to implement various embodiments of the microprocessors described above. In one example, computing system 1100 is a network system 1100. Specific devices may utilize all of the components shown, or only a subset of the components, and levels of integration may vary from device to device. Furthermore, a device may contain multiple instances of a component, such as multiple processing units, processors, memories, transmitters, receivers, etc.

The network system may comprise a computing system 1101 equipped with one or more input/output devices, such as network interfaces, storage interfaces, and the like. The computing system 1101 may include a central processing unit (CPU) 1110, a memory 1120, a mass storage device 1130, and an I/O interface 1160 connected to a bus 1170, where the CPU can include a microprocessor such as described above with respect to FIGS. 1A and 1B. The computing system 1101 is configured to connect to various input and output devices (keyboards, displays, etc.) through the I/O interface 1160. The bus 1170 may be one or more of any type of several bus architectures including a memory bus or memory controller, a peripheral bus or the like.

The CPU 1110 may comprise any type of electronic data processor, including the microprocessor 1120 of FIG. 1B. The CPU 1110 may be configured to implement any of the schemes described herein with respect to the pipelined operation using any one or combination of steps described in the embodiments. The memory 1120 may comprise any type of system memory such as static random-access memory (SRAM), dynamic random-access memory (DRAM), synchronous DRAM (SDRAM), read-only memory (ROM), a combination thereof, or the like. In an embodiment, the memory 1120 may include ROM for use at boot-up, and DRAM for program and data storage for use while executing programs.

The mass storage device 1130 may comprise any type of storage device configured to store data, programs, and other information and to make the data, programs, and other information accessible via the bus 1170. The mass storage device 1130 may comprise, for example, one or more of a solid-state drive, hard disk drive, a magnetic disk drive, an optical disk drive, or the like.

The computing system 1101 also includes one or more network interfaces 1150, which may comprise wired links, such as an Ethernet cable or the like, and/or wireless links to access nodes or one or more networks 1180. The network interface 1150 allows the computing system 1101 to communicate with remote units via the network 1180. For example, the network interface 1150 may provide wireless communication via one or more transmitters/transmit antennas and one or more receivers/receive antennas. In an embodiment, the computing system 1101 is coupled to a local-area network or a wide-area network for data processing and communications with remote devices, such as other processing units, the Internet, remote storage facilities, or the like. In one embodiment, the network interface 1150 may be used to receive and/or transmit interest packets and/or data packets in an ICN. Herein, the term "network interface" will be understood to include a port.

The components depicted in the computing system of FIG. 14 are those typically found in computing systems suitable for use with the technology described herein, and are intended to represent a broad category of such computer components that are well known in the art. Many different bus configurations, network platforms, and operating systems can be used.

The technology described herein can be implemented using hardware, firmware, software, or a combination of these. Depending on the embodiment, these elements of the embodiments described above can include hardware only or a combination of hardware and software (including firmware). For example, logic elements programmed by firmware to perform the functions described herein is one example of elements of the described FPU. An FPU can include a processor, FGA, ASIC, integrated circuit or other type of circuit. The software used is stored on one or more of the processor readable storage devices described above to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. A computer readable medium or media does (do) not include propagated, modulated or transitory signals.

Communication media typically embodies computer readable instructions, data structures, program modules or other data in a propagated, modulated or transitory data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

In alternative embodiments, some or all of the software can be replaced by dedicated hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), special purpose computers, etc. In one embodiment, software (stored on a storage device) implementing one or more embodiments is used to program one or more processors. The one or more processors can be in communication with one or more computer readable media/storage devices, peripherals and/or communication interfaces.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of calculating a floating-point dot-product performed by a processor, comprising:

receiving a sequence of first floating-point numbers of a first operand at a floating-point unit (FPU) processor, the sequence of the first floating-point numbers having a sign, a mantissa value and an exponent value;

receiving a sequence of second floating-point numbers of a first operand at a floating-point unit (FPU) processor, the sequence of the second floating-point numbers having a sign, a mantissa value and an exponent value;

storing the of the sequences of the first and the second floating-point numbers in one of a memory or a register; and determining, by the FPU, the floating-point dot-product of the sequences of the first floating-point numbers and the sequence of the second floating-point numbers, by:

adding the exponent values of the sequences of the first and the second floating-point numbers to determine an exponent product, the exponent product having a high exponent and a low exponent;

calculating, by a set of inverters, a shift amount as a one's complement of the low exponent;

multiplying the mantissas of the sequences of the first and second floating-point numbers to determine a product value of the mantissas;

right shifting the product value of the mantissas by the shift amount to generate a shifted product;

selecting, by a multiplexor, one or more first segments of an accumulator based on the high exponent, and adding the one or more first selected segments to the shifted product to generate a sum, the accumulator comprising a first accumulator register; and writing the generated sum into the selected one or more first segments of the accumulator.

2. The method of claim 1, wherein the accumulator includes one or more second segments consisting of the leftmost bits to a left of the one or more first segments;

the accumulator includes one or more third segments consisting of the rightmost bits to a right of the one or more first segments; and the FPU further comprises:

a second accumulator register divided into segments, in which each segment's value is one more than the value present in the corresponding segment of the accumulator; and a third accumulator register, divided into segments, in which each segment's value is one less than the value present in the corresponding segment of the accumulator.

3. The method of claim 2, wherein each segment in the accumulator include first and second flag register bits, the first and second flag register bits identify a state of each segment in the accumulator, and each of the first and second flag register bits are updated when bits in a corresponding segment of the accumulator is updated.

4. The method of claim 3, wherein the first flag register bits are stored in a first flag register, the second flag register bits are stored in a second flag register, and the first flag register includes all one bits and the second flag register includes all zero bits.

5. The method of claim 2, further comprising:

updating the one or more second segments when the sum written into the one or more first segments of the accumulator is positive with a carry-out, wherein j+1 of the one or more second segments are loaded from a corresponding j+1 of the one or more of the corresponding second accumulator segments, j+1 of the one or more corresponding third accumulator segments are loaded from a corresponding j+1 one or more second segments of the accumulator, j+1 of the one or more corresponding second accumulator register segments are incremented, and j represents a number of consecutive segments set with the first flag register bits immediately to the left of the first segments.

6. The method of claim 2, further comprising:

updating the one or more second segments when the sum written into the one or more first segments of the accumulator is negative, wherein j+1 of the one or more second segments are loaded from a corresponding j+1 of the one or more of the corresponding third accumulator segments, j+1 of the one or more corresponding second accumulator segments are loaded from a corresponding j+1 one or more second segments of the accumulator, j+1 of the one or more corresponding third accumulator register segments are decremented, and j represents a number of consecutive segments set with the second flag bits immediately to the left of the first segments.

7. The method of claim 2, wherein the one or more third segments consisting of the rightmost bits to the right of the one or more first segments remain unchanged by selecting the one or more third segments output as the next input to the corresponding one or more third segments or by clock-gating the segments off.

8. The method of claim 2, wherein the floating-point dot product is a 2's complement format of the values of the registers of the accumulator for all segments.

9. The method of claim 2, wherein when the floating-point dot product is positive, the floating-point dot product is a sign-magnitude format of the values of the registers of the accumulator for all segments, excluding a most significant bit of the registers;

when the floating-point dot product is negative, the floating-point dot product is a sign-magnitude format of a 1's complement of the values of the registers of the third accumulator for all segments, excluding the most significant bit of the registers, and the sign-bit of the floating-point dot product is the most significant bit of the registers of the accumulator regardless of whether the most-significant bit of the registers of the accumulator was positive or negative.

10. A microprocessor, comprising:

a first input register configured to hold a sequence of first floating-point numbers of a first operand, the sequence of the first floating-point numbers having a sign, a mantissa value and an exponent value;

a second input register configured to hold a sequence of second floating-point numbers of a first operand, the sequence of the second floating-point numbers having a sign, a mantissa value and an exponent value; and a floating-point unit connected to the first and second input registers and configured to compute a floating-point dot-product of the sequence of the first floating-point numbers and the sequence of the second floating-point numbers, the floating-point unit comprising:

an adder adding the exponent values of the sequences of the first and the second floating-point numbers to determine an exponent product, the exponent product having a high exponent and a low exponent;

a set of inverters, one for each bit of the low exponent, which calculate a shift amount as a one's complement of the low exponent;

a multiplier for multiplying the mantissas of the sequences of the first and second floating-point numbers to determine a product value of the mantissas;

a shifter, for right shifting the product value of the mantissas by the shift amount to generate a shifted product;

a multiplexor for selecting one or more first segments of an accumulator based on the high exponent, and adding the one or more first selected segments to the shifted product to generate a sum, the accumulator comprising a first accumulator register; and a set of multiplexors, one for each segment of the accumulator, for writing the generated sum into the selected one or more first segments of the accumulator.

11. The microprocessor of claim 10, wherein the accumulator comprises:

one or more second segments consisting of the leftmost bits to a left of the one or more first segments;

one or more third segments consisting of the rightmost bits to a right of the one or more first segments; and the floating-point unit further comprises:

a second accumulator register divided into segments, in which each segment's value is one more than the value present in the corresponding segment of the accumulator; and a third accumulator register, divided into segments, in which each segment's value is one less than the value present in the corresponding segment of the accumulator.

12. The microprocessor of claim 11, wherein each segment in the accumulator include first and second flag register bits, the first and second flag register bits identify a state of each segment in the accumulator, and each of the first and second flag register bits are updated when bits in a corresponding segment of the accumulator is updated.

13. The microprocessor of claim 12, wherein the first flag register bits are stored in a first flag register, the second flag register bits are stored in a second flag register, and the first flag register includes all one bits and the second flag register includes all zero bits.

14. The microprocessor of claim 11, the floating-point unit further comprises:

updating the one or more second segments when the sum written into the one or more first segments of the accumulator is positive with a carry-out, wherein j+1 of the one or more second segments are loaded from a corresponding j+1 segments of the one or more of the corresponding second accumulator segments, j+1 of the one or more corresponding third accumulator-segments are loaded from a corresponding j+1 one or more second segments of the accumulator, j+1 of the one or more corresponding second accumulator register segments are incremented, and j represents a number of consecutive segments set with the first flag register bits immediately to the left of the first segments.

15. The microprocessor of claim 11, wherein the floating-point unit further comprises:

updating the one or more second segments when the sum written into the one or more first segments of the accumulator is negative, wherein j+1 of the one or more second segments are loaded from a corresponding j+1 of the one or more of the corresponding third accumulator segments, j+1 of the one or more corresponding second accumulator segments are loaded from a corresponding j+1 one or more second segments of the accumulator, j+1 of the one or more corresponding third accumulator register segments are decremented, and j represents a number of consecutive segments set with the second flag bits immediately to the left of the first segments.

16. The microprocessor of claim 11, wherein the one or more third segments consisting of the rightmost bits to the right of the one or more first segments remain unchanged by selecting the one or more third segments output as the next input to the corresponding one or more third segments or by clock-gating the segments off.

17. The microprocessor of claim 11, wherein the floating-point dot product is a 2's complement format of the values of the registers of the accumulator for all segments.

18. The microprocessor of claim 11, wherein when the floating-point dot product is positive, the floating-point dot product is a sign-magnitude format of the values of the registers of the accumulator for all segments, excluding a most significant bit of the registers;

when the floating-point dot product is negative, the floating-point dot product is a sign-magnitude format of a 1's complement of the values of the registers of the third accumulator for all segments, excluding the most significant bit of the registers, and the sign-bit of the floating-point dot product is the most significant bit of the registers of the accumulator regardless of whether the most-significant bit of the registers of the accumulator was positive or negative.

* * * * *